United States Patent
Zhao (10) Patent No.: US 10,972,915 B2
(45) Date of Patent: Apr. 6, 2021

(54) METHOD OF CONTROLLING HOTSPOT ACCESS ON MULTI-BAND ACCESS POINT

(71) Applicant: ARRIS Enterprises LLC, Suwanee, GA (US)

(72) Inventor: Wen Ji Zhao, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/580,870

(22) PCT Filed: Sep. 18, 2017

(86) PCT No.: PCT/CN2017/102082
§ 371 (c)(1),
(2) Date: Dec. 8, 2017

(87) PCT Pub. No.: WO2019/051833
PCT Pub. Date: Mar. 21, 2019

(65) Prior Publication Data
US 2020/0213849 A1    Jul. 2, 2020

(51) Int. Cl.
*H04W 48/20* (2009.01)
*H04W 12/08* (2021.01)
*H04W 12/00* (2021.01)
*H04W 48/06* (2009.01)
*H04W 88/10* (2009.01)

(52) U.S. Cl.
CPC ........ *H04W 12/08* (2013.01); *H04W 12/003* (2019.01); *H04W 12/00514* (2019.01); *H04W 48/06* (2013.01); *H04W 88/10* (2013.01)

(58) Field of Classification Search
USPC .......................................................... 726/4
See application file for complete search history.

(56) References Cited

U.S. PATENT DOCUMENTS

| | | | |
|---|---|---|---|
| 7,490,351 B1 * | 2/2009 | Caves | H04L 29/12028 726/13 |
| 9,402,217 B1 * | 7/2016 | Khan | H04W 36/22 |
| 2017/0230905 A1 * | 8/2017 | Pularikkal | H04W 12/0609 |

FOREIGN PATENT DOCUMENTS

| | | |
|---|---|---|
| CN | 105578465 A | 5/2016 |
| CN | 205847614 U | 12/2016 |
| CN | 106658653 A | 5/2017 |
| CN | 106792619 A | 5/2017 |

OTHER PUBLICATIONS

PCT International Search Report & Written Opinion, RE: Application No. PCT/CN2017/102082, dated May 30, 2018.

* cited by examiner

*Primary Examiner* — Brandon S Hoffman
(74) *Attorney, Agent, or Firm* — Wenderoth, Lind & Ponack, L.L.P.

(57) ABSTRACT

Methods, systems, and computer readable media may be operable to wireless hotspot activity of one or more access points supporting multiple radios. A DHCP relay agent may receive a DHCP request from a device seeking to join a hotspot service provided through a gateway. If the number of currently connected devices is less than the maximum connected device limit, then the agent may increase the number of currently connected devices by one, and relay the encapsulated DHCP request over a GRE tunnel. If the number of connected devices already meets or exceeds the allowed limit, then the DHCP relay agent may instruct the gateway or its access point to disconnect the new device.

20 Claims, 5 Drawing Sheets

Figure 5

METHOD OF CONTROLLING HOTSPOT ACCESS ON MULTI-BAND ACCESS POINT

TECHNICAL FIELD

This disclosure relates to management and control of wireless hotspot activity of one or more access points supporting multiple radios.

BACKGROUND

Multiple System Operators (MSOs), also known as cable companies, as well as other service providers have been expanding their service offering into wireless services, including hotspot services. Hotspot services allow a subscribing customer to access the Internet over a wireless connection from a mobile device when they are away from their home. Providing hotspot services requires a complex infrastructure of physical devices and network services.

At the most basic level, hotspot services are delivered over a wireless connection. An available wireless connection for hotspot services can be advertised by a wireless access point. Each different hotspot service may have separate wide area network (WAN) authentication and authorization services connected to the local wireless access point. A mobile device that has been configured to access a particular hotspot service will attempt to connect to access points advertising that hotspot service. As a mobile device attempts to connect to an access point advertising a certain hotspot service, the mobile device must contact the hotspot service's WAN authorization and authentication servers.

To expand the coverage of operator hotspots, many operators have utilized their existing broadband home gateways. The wireless technology in a broadband home gateway may support 2.4 GHz as well as 5 GHz radio bands. To achieve good wireless coverage in a home, it is also not unusual for multiple access points to be deployed in a home that feed their traffic back to a single broadband home gateway. Each access point may have 1 or more radios allowing that AP to support one or both of the 2 radio bands mentioned earlier.

A broadband home gateway device supporting hotspot services must balance the hotspot services for roaming customers against wireless access for the home user. The different types of traffic may be segregated to ensure that the amount of hotspot traffic, for example, does not exceed a certain percentage of the home's overall bandwidth. Also, if the home user has a data usage limit, often called a "byte cap", the client traffic from a hotspot must not be counted against the home gateway user's byte cap.

After reaching a broadband home gateway, hotspot traffic is commonly sent back into the wider broadband network using one or more Generic Routing Encapsulation (GRE) tunnels. GRE technology encapsulates an Internet Protocol (IP) packet within another IP packet by wrapping the original packet with a new IP header. The GRE encapsulation provides a virtual IP tunnel through the broadband network because the encapsulated traffic's actual destination is not known to the intervening broadband network. GRE-encapsulated packets travel to the destination of the outer GRE header, where the packets can be unwrapped and usually analyzed further before being forwarded to their final destination as marked on the original packet header. GRE tunnels allow hotspot traffic on a gateway to be segregated from the gateway's non-hotspot traffic.

The broadband home gateway encapsulates the hotspot traffic using GRE and sends the traffic to a wireless access gateway (WAG) in the Wide Area Network (WAN). The WAG is responsible for hotspot management functions, including admission and authentication of hotspot client devices. The local access point within the broadband home gateway is not aware of any details of the hotspot service. The broadband home gateway encapsulates the data coming from a hotspot SSID then passes the traffic back to the WAG. In some environments, multiple SSIDs may be provided, supported by multiple WAGs. Each WAG may have a unique GRE tunnel linking it with the gateway.

A WAG also typically provides Dynamic Host Configuration Protocol (DHCP) services for hotspot clients. When a device first connects to a new access point, that device does not have an IP address for communication into the WAN. The device sends a DHCP request into the network asking for an IP address to be provided. The access point is not a DHCP server, so it forwards the DHCP request along to the router. The router may provide DHCP services for some devices, but may not be a DHCP server for wireless traffic, so the router encapsulates DHCP request from hotspot devices with a GRE header and sends them along to the WAG. The WAG can provide DHCP services to hotspot clients, so after removing the DHCP encapsulation, it receives the request and acts upon it.

A problem can arise if too many devices join a single broadband home gateway's hotspot. If there are too many devices attached to a hotspot, all the devices will experience degraded performance since the hotspot has limited bandwidth that must be shared among all attached devices. Initial hotspot deployments attempted to address this problem by requiring each access point to limit the number of devices that may attach to a hotspot SSID. However, as each access point is only aware of its own attached clients, these attempts do not adequately reduce degraded performance in increasingly complex home wireless networks in which a broadband home gateway may support multiple access points within the home as no entity currently manages or controls the overall number of hotspot-attached clients routing traffic through the gateway.

Therefore, a need exists for improving methods and systems for management and control of wireless hotspot activity of one or more access points supporting multiple radios.

SUMMARY

The present invention is drawn to a system and method for controlling hotspot access on a gateway.

One embodiment comprises receiving an initialization request from a device seeking to join the hotspot service, comparing the number of devices currently connected to the hotspot service to a maximum connected device limit permitted by the gateway device, and approving the initialization request if the number of currently connected devices is less than the maximum connected device limit.

An embodiment may further comprise increasing the number of currently connected devices by one, encapsulating the initialization request; and relaying the encapsulated initialization request over a GRE tunnel.

The embodiment may further comprise rejecting the initialization request, if the number of currently connected devices is equal to or greater than the maximum connected device limit. The initialization request may be rejected by at least sending a disconnect message to the device seeking to join the hotspot.

The embodiment may further comprise reducing the number of currently connected devices by one after receiving a notification that a device is no longer connected.

The maximum connected device limit within embodiments may be set by at least one of: a default value, a remotely configurable parameter, or an algorithm, wherein the factors affecting the algorithm setting the maximum connected device limit comprise at least one of: the number of home user devices, the number of access point radios carrying the hotspot SSID, or the amount of other activity in the broadband network. A remotely configurable parameter influencing the maximum connected device limit is configurable during initialization or normal operation by at least the WAG associated with the hotspot or a network management entity.

The embodiments' initialization request may comprise a DHCP request.

Alternate apparatus embodiments may comprise an interface configured to receive an initialization request from a device seeking to join a hotspot; a memory configured to store a unique identifier of devices connected to the hotspot and a maximum number of devices allowed to connect to the hotspot with one or more modules configured to compare the number of unique identifiers of devices connected to the hotspot to the maximum number of devices allowed to connect to the hotspot; and approve the initialization request, if the number of unique identifiers is less than the maximum allowed number of hotspot devices.

Another embodiment in one or more non-transitory computer readable media having instructions operable to cause one or more processors to control access to a hotspot service provided through a gateway device by performing operations may comprise: receiving an initialization request from a device seeking to join the hotspot service; comparing the number of devices currently connected to the hotspot service through the gateway to a maximum connected device limit permitted by the gateway device; and if the number of currently connected devices is less than the maximum connected device limit, approving the join request.

BRIEF DESCRIPTION OF THE DRAWINGS

Like reference numbers and designations in the various drawings indicate like elements.

DETAILED DESCRIPTION

It is desirable to improve upon methods and systems for management and control of wireless hotspot activity of one or more access points supporting multiple radios. Methods, systems, and computer readable media may be operable to manage and control wireless hotspot activity on one or more access points supporting multiple radios. A DHCP Relay agent may receive a DHCP request from a device seeking to join a hotspot service. The DHCP Relay agent may compare the number of devices currently connected to the hotspot service over its resident broadband gateway to a limit of connected devices for hotspot service over that gateway. If the number of currently connected devices is at or below the limit, then the DHCP relay device may allow the DHCP request to be encapsulated and sent on. If not, the DHCP relay agent may refuse to pass on the DHCP request and may also direct the appropriate AP to send a disconnect message to that requesting device.

Figure 1:
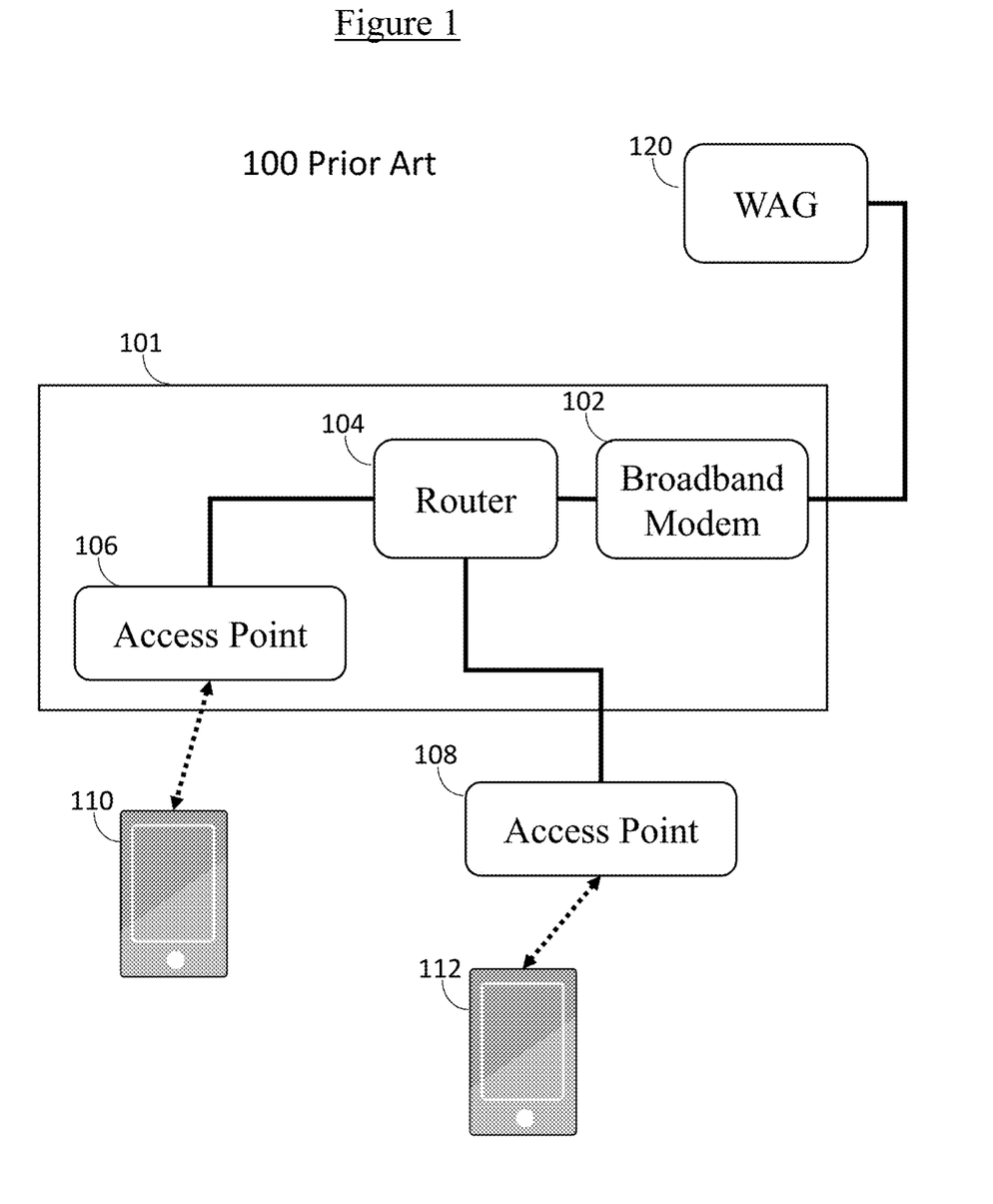
FIG. 1 is a block diagram illustrating an example of a typical current hotspot network architecture.

FIG. 1 is a block diagram illustrating an example of the current hotspot network environment 100. A broadband home gateway device 101 may provide high speed data services to a subscriber. The gateway 101 may contain a broadband modem 102 providing a WAN connection to a larger network, such as the Internet. Broadband modems are well known in the art, such cable modems, DSL modems, optical network units (ONU), and the like. The gateway 101 may contain a router 104 that can perform a variety of data processing and routing functions, including, but not limited to, GRE encapsulation for some packets. Routers and GRE encapsulation are well known in the art.

The gateway 101 may contain an access point 106 that can support wireless connections to other devices, such as a smartphone 110. Other wireless devices that connect to APs are well known to those skilled in the art, such as laptops, tablets, printers, among many other devices (not shown). While access point 106 is shown within the broadband home gateway 101, it is well known in the art that an access point may also be a device that stands alone and communicates to a broadband home gateway using wired or wireless means, such as Ethernet, MoCA, wireless mesh or wireless repeater technology, as shown in access point 108. Other embodiments may include multiple access points 106 internal to the gateway 101 as well as access points 108 external to the gateway 101, not shown. Router 104 supports both access points 106 and 108, providing services such as routing, or data processing, including GRE tunnel management and GRE traffic encapsulation.

Access point 106 may support multiple services, such as hotspot service, video over wireless services, and other wireless services well known in the art. Access point 106 may support these services using one or more SSIDs. Each SSID may support a group of devices providing like services. Access point 106 may also support one or more Virtual Local Area Networks (VLANs) that may be used to classify the traffic for routing within gateway 101. Traffic from one or more SSIDs may be classified into a VLAN. The VLAN classification may allow Router 104 to distinguish the sources of different types of traffic. In embodiments, hotspot traffic may be marked as part of a VLAN to allow DHCP router 104 to distinguish that traffic from other wireless traffic. In embodiments, a plurality of VLANs may be used when a plurality of services are to be supported within gateway 101 by router 104.

Device 110 may have an app that can identify hotspot SSIDs. After identifying that access point 106 is broadcasting a hotspot SSID, device 110 may seek to join that SSID. Access point 106 may alternatively be configured with silent SSIDs, as is well known in the art. In that case, the mobile device 110 may ask the access point 106 if it supports the hotspot SSID.

Traffic from device 112, including for example a DHCP request, may travel to access point 108 over a hotspot SSID. Access point 108 may be configured to send at least traffic from the hotspot SSID to router 104. In embodiments, the hotspot SSID traffic may be carried by a VLAN. Access point 108 may be configured with a limit for the number of hotspot devices allowed to connect simultaneously. Access point 108 may discard traffic from device 112 if the number of devices connected to the hotspot is already greater than or equal to the configured limit.

If the number of devices is less than the configured limit, access point 108 may pass the traffic on to router 104. Router 104 may encapsulate the traffic using GRE so that it will eventually reach WAG 120. After encapsulation, router 104 may send the traffic to broadband modem 102. Broadband modem 102 may send the traffic to WAG 120. WAG 120 in the WAN may receive the encapsulated traffic from device 110. In embodiments, gateway 101 may provide a plurality of hotspot services, or other authenticated services that are supported by a plurality of WANs. It is typical in the art that a GRE tunnel only has a single termination, so multiple GRE tunnels would be required to reach multiple WAGs supporting multiple hotspots.

Each access point, 106 and 108, independently control the number of hotspot clients that connect to them respectively. If the limit for the home hotspot was 10 connected devices, no element in the current environment can police the overall number of connected devices.

Figure 2:
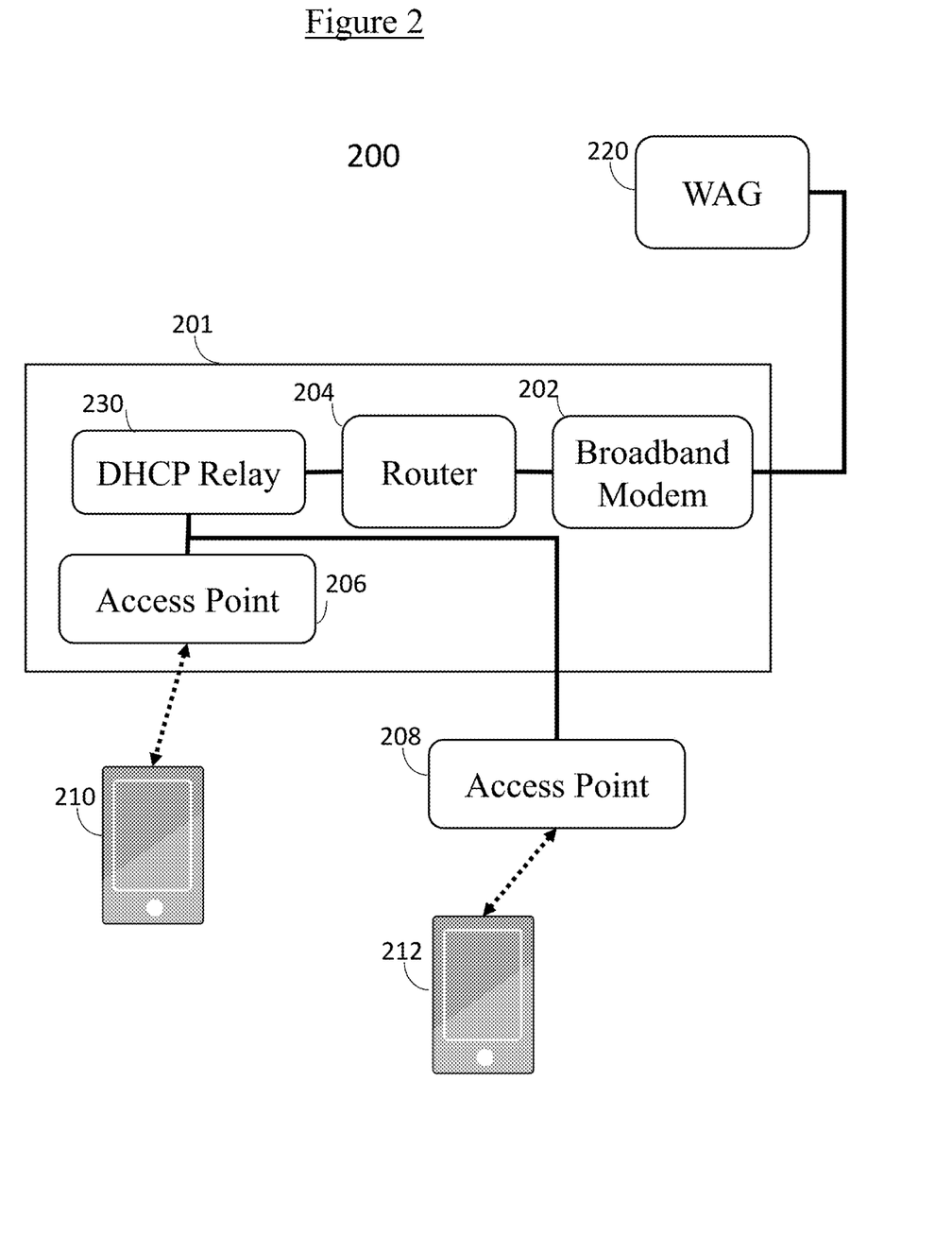
FIG. 2 is a block diagram illustrating an example of a hotspot architecture operable to facilitate the management of hotspot device connections in accordance with the principles of the invention.

FIG. 2 is a block diagram illustrating an example of the improved hotspot network environment 200 operable to facilitate the management and control of hotspot access.

In embodiments, a broadband home gateway device 201 may provide high speed data services to a subscriber. The gateway 201 may contain a broadband modem 202 providing a WAN connection to a larger network, such as the Internet. The gateway 201 may contain a router 204 that can perform a variety of data processing and routing functions, including, but not limited to, GRE encapsulation for some packets.

Gateway 201 may contain a DHCP Relay Agent 230. DHCP Relay agent 230, as well known in the art, monitors IP traffic for DHCP messages. When DHCP relay agent 230 finds a DHCP message, it may act upon the message, discard it, or pass it along in the outgoing data flow.

The gateway 201 may contain an access point 206 that can support wireless connections to other devices, such as a smartphone 210. While access point 206 is shown within the broadband home gateway 201, it is well known in the art that an access point may also be a device that stands alone and communicates to a broadband home gateway using wired or wireless means, such as Ethernet, MoCA, wireless mesh or wireless repeater technology, as shown in access point 208. Other embodiments may include multiple access points 206 internal to the gateway 201 as well as access points 208 external to the gateway 201, not shown.

Access point 206 may support multiple services, such as hotspot service, video over wireless services, and other wireless services well known in the art. Access point 206 may support these services using one or more SSIDs. Each SSID may support a group of devices providing like services. Access point 206 may also support one or more Virtual Local Area Networks (VLANs) that may be used to classify the traffic for routing within gateway 201. Traffic from one or more SSIDs may be classified into a VLAN. The VLAN classification may allow DHCP relay agent 230 and router 204 to distinguish the sources of different types of traffic. In embodiments, hotspot traffic may be marked as part of a VLAN to allow DHCP relay agent 230 and router 204 to distinguish that traffic from other wireless traffic. In embodiments, a plurality of VLANs may be used when a plurality of services are to be supported within gateway 201 by router 204.

Device 210 may have an app that can identify hotspot SSIDs. After identifying that access point 206 is broadcasting a hotspot SSID, device 210 may seek to join that SSID. Access point 206 may alternatively be configured with silent SSIDs, as is well known in the art. In that case, the mobile device 210 may ask the access point 206 if it supports the hotspot SSID.

Traffic from device 212, including for example a DHCP request, may travel to access point 208 over a hotspot SSID. Access point 208 may be configured to send at least traffic from the hotspot SSID to DHCP relay agent 230. In embodiments, the hotspot SSID traffic may be carried by a VLAN. Relay agent 230 may be configured with a limit for the number of hotspot devices allowed to connect simultaneously. Relay agent 230 may discard traffic from device 210 if the number of devices connected to the hotspot is already greater than or equal to the configured limit. Relay agent 230 may also request that access point 206 sends a disconnect message to device 210, if the number of connected devices is already at its maximum allowed level. A disconnect message is well known to those skilled in the art as a message that an access point can send to a device that direct that device to seek a different access point for a wireless connection.

If the number of devices is less than the configured limit, DHCP relay agent 230 may pass the traffic on to router 204. Router 204 may encapsulate the traffic using GRE so that it will eventually reach WAG 220. After encapsulation, router 204 may send the traffic to broadband modem 202. Broadband modem 202 may send the traffic to WAG 220 in the WAN. WAG 220 may receive the encapsulated traffic from device 210. In embodiments, gateway 201 may provide a plurality of hotspot services, or other authenticated services that are supported by a plurality of WANs. It is typical in the art that a GRE tunnel only has a single termination, so multiple GRE tunnels would be required to reach multiple WAGs supporting multiple hotspots. While this embodiment has an example ordering and grouping of functionality, one skilled in the art would understand that other orderings and groupings of the described functionality are possible.

Figure 3:
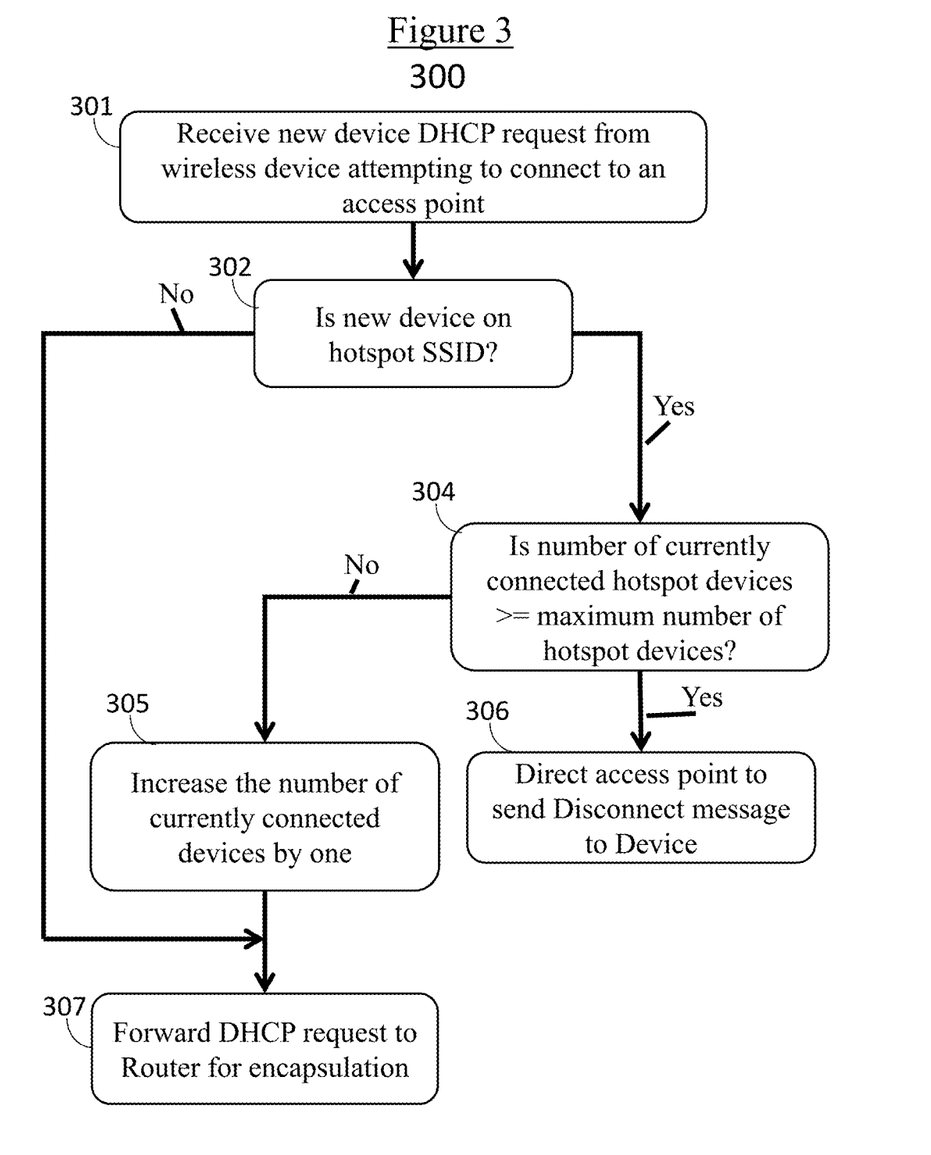
FIG. 3 is a flowchart illustrating an example process operable to facilitate the management of hotspot device connections in accordance with the principles of the invention.

FIG. 3 is a flow chart illustrating an example process 300 operable to facilitate the management and control of hotspot access.

At 301, the process may begin when a DHCP request is received from a new device that is attempting to connect to an access point. It should be understood that while this example uses IPv4 conventions, this process is equally applicable to IPv6, for example a DHCPv6 relay agent. The DHCP request may have been received from a device attempting to connect to an access point supporting at least a hotspot SSID. The access point may support more than one SSID.

At 302, a determination may be made whether or not the new device is attempting to connect to a hotspot SSID. In embodiments, the determination may be made by the use of a dedicated virtual local area network (VLAN). An access point may direct packets to different VLANs depending upon which SSID or radio received the packet. When a device connects to a particular SSID, its traffic may be directed to a specific VLAN to allow that traffic to be treated differently than traffic from another SSID.

At 304, if the new device was found to be on a hotspot SSID in 302, then the process checks if the number of currently connected devices is already greater than or equal to the maximum number of devices allowed to connect to that hotspot. In embodiments, the maximum allowed number of devices on a hotspot may be set by a default value or a configuration parameter that is provided during broadband home gateway initialization. The parameter might also be configurable during normal operation by the WAG associated with that hotspot or a network management entity. In other embodiments, the maximum number of allowed devices may be determined based upon an algorithm comprising one or more factors such as: the number of home user devices, the number of access point radios carrying the hotspot SSID, or the amount of other activity in the broadband network. In embodiments, if the maximum number of devices is changed during operation, the number of devices may be greater than the maximum allowed number of devices, at least temporarily.

At 306, the determination made in 304 that there are already at least as many devices connected to the hotspot as the current maximum number of allowed devices may result in the access point associated with the new device being directed to send a disconnect message to the new device. In embodiments, the access point associated with the new device may be known because of the VLAN used for the DHCP request or the connection which received the DHCP request may be uniquely tied to a specific access point. A disconnect message is well known to those skilled in the art as a message that an access point can send to a device that directs that device to seek a different access point for a wireless connection. In other embodiments, other messages or techniques might be used to notify the new device that it will not be accepted by this access point.

At 305, if the determination in 304 was that the number of currently connected hotspot devices is lower than the maximum allowed number of hot spot devices for that gateway, then the counter tracking the number of currently connected devices may be increased by one.

At 307, after the counter tracking hotspot clients was increased in 305, the DHCP request may be sent to the router for GRE encapsulation. In embodiments, after encapsulation, the DHCP request may be sent on to a WAG or other hotspot management entity for further processing.

New devices joining SSIDs other than the hotspot SSID in 302 may have their DHCP requests also sent to the router for encapsulation. In embodiments, the non-hotspot DHCP request may be sent on to a WAG or other client management entity for further processing.

Figure 4:
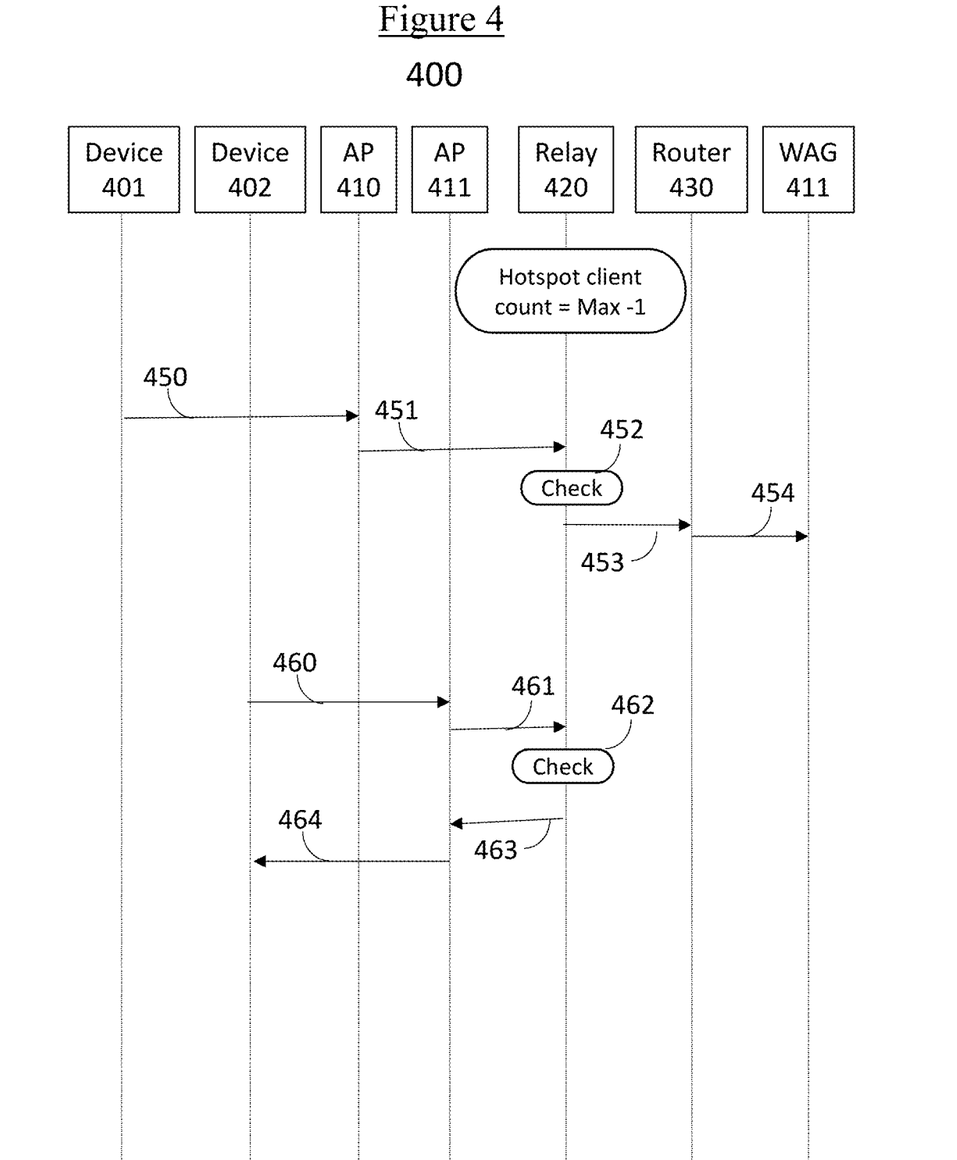
FIG. 4 is a data flow diagram illustrating an example messaging sequence operable to facilitate the management of hotspot connections in accordance with the principles of the invention.

FIG. 4 is an example message flow diagram illustrating a process operable to facilitate the management and control of hotspot access.

Message flow 400 involves two devices, 401 and 402, that try in succession to connect to a local hotspot supported by access points 410 and 411. DHCP relay agent 420 supports access points 410 and 411. Router 430 provides a secure link between relay 420 and WAG 411. DHCP relay agent 420 has configuration information including the local hotspot configuration using access points 410 and 411, as well as the maximum number of clients allowed on the local hotspot across all access points. For the sake of illustration, the current count of client devices associated with the local hotspot is assumed to be one less than the configured limit.

The process begins with device 401 attempting to join a local hotspot supported by access point 410 by sending at least a message 450 including a DHCP request to access point 410.

Access point 410 passes the DHCP request to the DHCP Relay 420 using message 451.

After receiving message 451, DHCP relay 420 associates message 451 with the local hotspot supported by access points 410 and 411. In embodiments, DHCP relay 420 may associate message 451 with the local hotspot due to a packet tag or other indication associated with message 451. An example of a message tag would be a VLAN tag. In check 452, DHCP relay 420 compares the current count of associated clients with the configured limit and finds the current count is one less than the configured limit. In embodiments, DHCP relay 420 may keep an explicit count of associated client devices per hotspot or it may track a unique identifier of each associated client devices and derive a count from that information.

After determining that the limit is not yet met, DHCP relay 420 increments the current count of associated clients by one and sends the DHCP request on to router 430 in message 453.

Router 430 passes the DHCP request to WAG 411 in message 454. In embodiments, router 430 may encapsulate message 453 to form message 454. One example of encapsulation is GRE.

At a later time, device 402 may seek to join the local hotspot through access point 411. Device 402 may send at least a message 460 including a DHCP request to access point 411.

Access point 411 passes the DHCP request to the DHCP Relay 420 using message 461.

After receiving message 461, DHCP relay 420 associates message 461 with the local hotspot supported by access points 410 and 411. In embodiments, DHCP relay 420 may associate message 461 due to a packet tag or other indication associated with message 461. In check 462, DHCP relay 420 compares the current count of associated clients with the configured limit and finds the current count is equal to the configured limit. In embodiments, DHCP relay 420 may keep an explicit count of associated client devices per hotspot or it may track a unique identifier of each associated client devices and derive a count from that information.

After determining that no more devices can be supported by the local hotspot, DHCP relay 420 directs access point 411 to disconnect device 402 using message 463. In embodiments, DHCP relay may send a message for access point 411 to relay on to device 402, or DHCP relay 420 may explicitly direct the access point to disconnect device 402. In embodiments, device 402 may have a shared protocol with DHCP relay 420 that allows access point 411 to pass a message to device 402 indicating that the device should try again later or seek another hotspot.

Upon receiving message 463 from DHCP Relay 420, access point 411 disconnects device 402 using message 464. As is appreciated by those skilled in the art, not all devices will accept a disconnect message immediately. Some devices may reapply immediately or after a back off interval.

Figure 5:
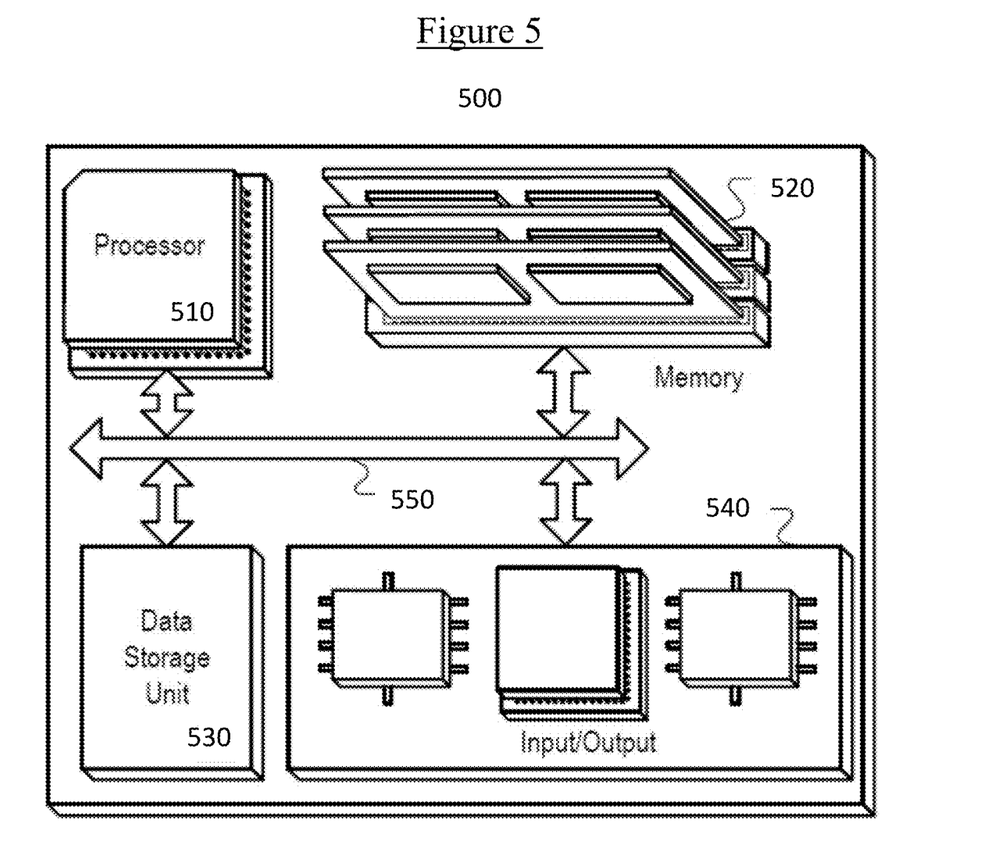
FIG. 5 is a block diagram illustrating an example apparatus operable to facilitate the management of hotspot connections in accordance with the principles of the invention.

FIG. 5 is a block diagram of an exemplary apparatus 500 operable to facilitate the management of hotspot connections in accordance with the principles of the invention. The apparatus 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the apparatus 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the apparatus 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the apparatus 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the apparatus 500.

The input/output device 540 provides input/output operations for the apparatus 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), and/or one or more wireless interface devices (e.g., an 802.11 card). In another implementation, the input/output device can include driver devices configured to send communications to, and receive communications from one or more networks connecting devices comprising routers (e.g., router 204) and/or access points (e.g., access points 206, 208).

Those skilled in the art will appreciate that the invention described herein improves upon methods and systems to facilitate the management of hotspot connections in accordance with the principles of the invention. Methods, systems, and computer readable media may be operable to facilitate the management of hotspot connections in accordance with the principles of the invention.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method for controlling access to a hotspot service provided through a gateway device, comprising the steps of:
receiving an initialization request from a device seeking to join the hotspot service;
tracking a unique identifier associated with the device;
comparing, by a dynamic host configuration protocol (DHCP) relay, the number of devices currently connected to the hotspot service to a maximum connected device limit permitted by the gateway device, wherein the number of devices currently connected to the hotspot service is derived from the tracking; and
if the number of currently connected devices is less than the maximum connected device limit, approving the initialization request.

2. The method of claim 1, further comprising the steps of:
increasing the number of currently connected devices by one;
encapsulating the initialization request; and
relaying the encapsulated initialization request over a GRE tunnel.

3. The method of claim 1, further comprising the step of:
rejecting the initialization request, if the number of currently connected devices is equal to or greater than the maximum connected device limit.

4. The method of claim 3, wherein the initialization request is rejected by at least sending a disconnect message to the device seeking to join the hotspot.

5. The method of claim 1, further comprising:
receiving a notification that the device is no longer connected; and
reducing the number of currently connected devices by one.

6. The method of claim 1, wherein the maximum connected device limit is set by at least one of:
a default value,
a remotely configurable parameter, or
an algorithm,
wherein the factors affecting the algorithm setting the maximum connected device limit comprise at least one of: the number of home user devices, the number of access point radios carrying the hotspot SSID, or the amount of other activity in the broadband network.

7. The method of claim 6, wherein a remotely configurable parameter influencing the maximum connected device limit is configurable during initialization or normal operation by at least the WAG associated with the hotspot or a network management entity.

8. The method of claim 1, wherein the initialization request comprises a DHCP request.

9. An apparatus comprising:
an interface configured to receive an initialization request from a device seeking to join a hotspot;
a memory configured to store a unique identifier of devices connected to the hotspot and a maximum number of devices allowed to connect to the hotspot;
one or more modules configured to:
track a unique identifier associated with the device;
compare, by a dynamic host configuration protocol (DHCP) relay, a number of unique identifiers of devices connected to the hotspot to the maximum number of devices allowed to connect to the hotspot, wherein the number of unique identifiers of devices connected to the hotspot service is derived from the tracking; and
approve the initialization request, if the number of unique identifiers is less than the maximum allowed number of hotspot devices.

10. The apparatus of claim 9, further comprising one or more modules configured to:
increase the number of currently connected devices by one;
encapsulate the initialization request; and
relay the encapsulated initialization request over a GRE tunnel.

11. The apparatus of claim 9, further comprising one or more modules configured to:
reject the initialization request, if the number of currently connected devices is equal to or greater than the maximum connected device limit.

12. The apparatus of claim 10, wherein the initialization request is rejected by at least sending a disconnect message to the device seeking to join the hotspot.

13. The apparatus of claim 9, further comprising one or more modules configured to:
receive, a notification that a device is no longer connected; and
reduce the number of currently connected devices by one.

14. One or more non-transitory computer readable media having instructions operable to cause one or more processors to control access to a hotspot service provided through a gateway device by performing operations comprising:
receiving an initialization request from a device seeking to join the hotspot service;
tracking a unique identifier associated with the device;
comparing, by a dynamic host configuration protocol (DHCP) relay, the number of devices currently connected to the hotspot service through the gateway to a maximum connected device limit permitted by the gateway device, wherein the number of devices currently connected to the hotspot service is derived from the tracking; and
if the number of currently connected devices is less than the maximum connected device limit, approving the join request.

15. The computer readable media having instructions operable to cause one or more processors to perform the operations of claim 14, further comprising the operations of:
increasing the number of currently connected devices by one;
encapsulating the initialization request; and
relaying the encapsulated initialization request over a GRE tunnel.

16. The computer readable media having instructions operable to cause one or more processors to perform the operations of claim 14, further comprising the operations of:
rejecting the initialization request, if the number of currently connected devices is equal to or greater than the maximum connected device limit.

17. The computer readable media having instructions operable to cause one or more processors to perform the operations of claim 14, wherein the initialization request is rejected by at least sending a disconnect message to the device seeking to join the hotspot.

18. The computer readable media having instructions operable to cause one or more processors to perform the operations of claim 14, further comprising the operations of:
receiving a notification that a device is no longer connected; and
reducing the number of currently connected devices by one.

19. The computer readable media having instructions operable to cause one or more processors to perform the operations of claim 14, wherein the maximum connected device limit is set by at least one of:

a default value,
a remotely configurable parameter, or
an algorithm,
   wherein the factors affecting the algorithm setting the maximum connected device limit comprise at least one of: the number of home user devices, the number of access point radios carrying the hotspot SSID, or the amount of other activity in the broadband network.

20. The computer readable media having instructions operable to cause one or more processors to perform the operations of claim 19, wherein a remotely configurable parameter influencing the maximum connected device limit is configurable during initialization or normal operation by at least the WAG associated with the hotspot or a network management entity.

* * * * *